Fig. 8

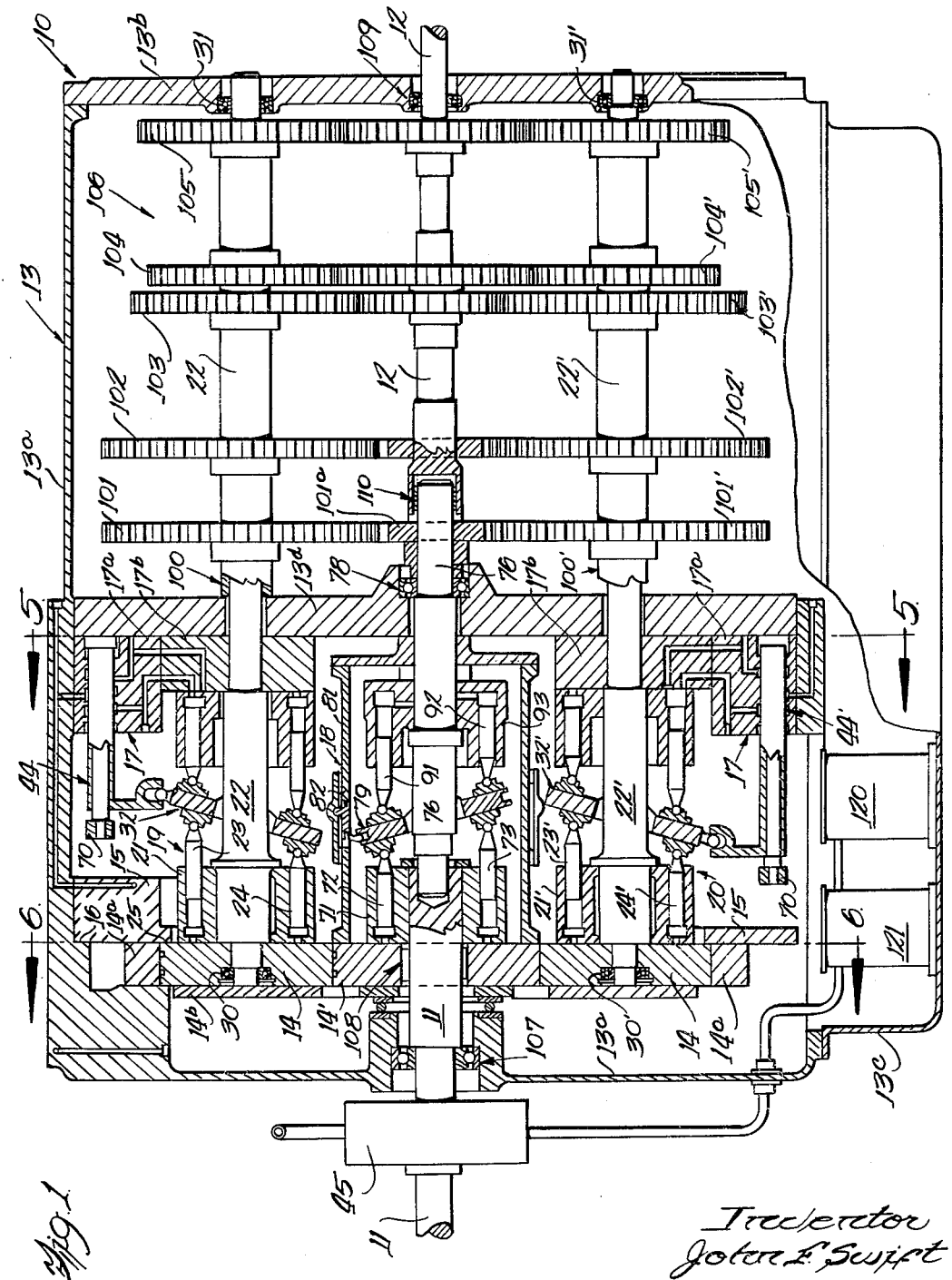

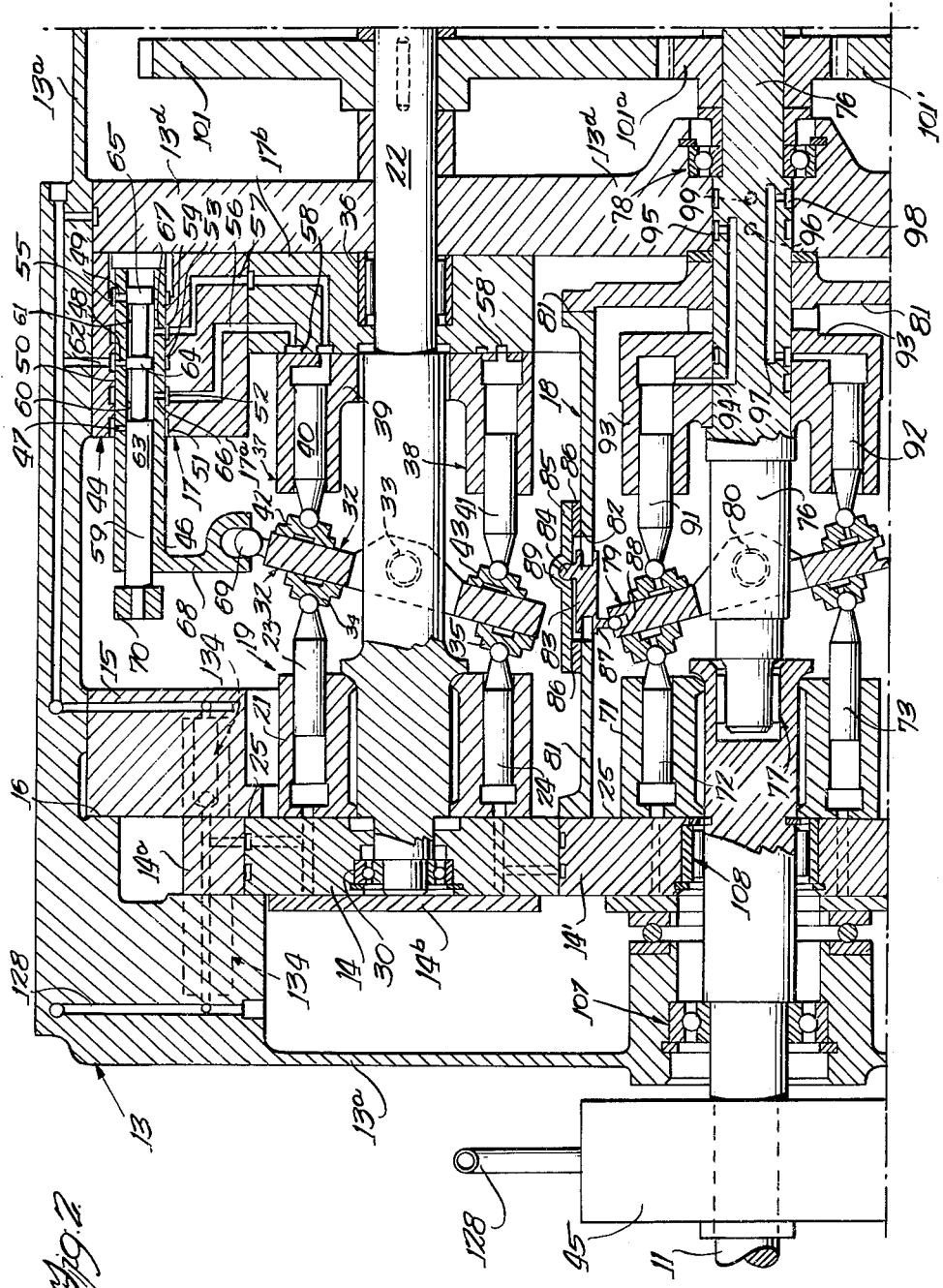

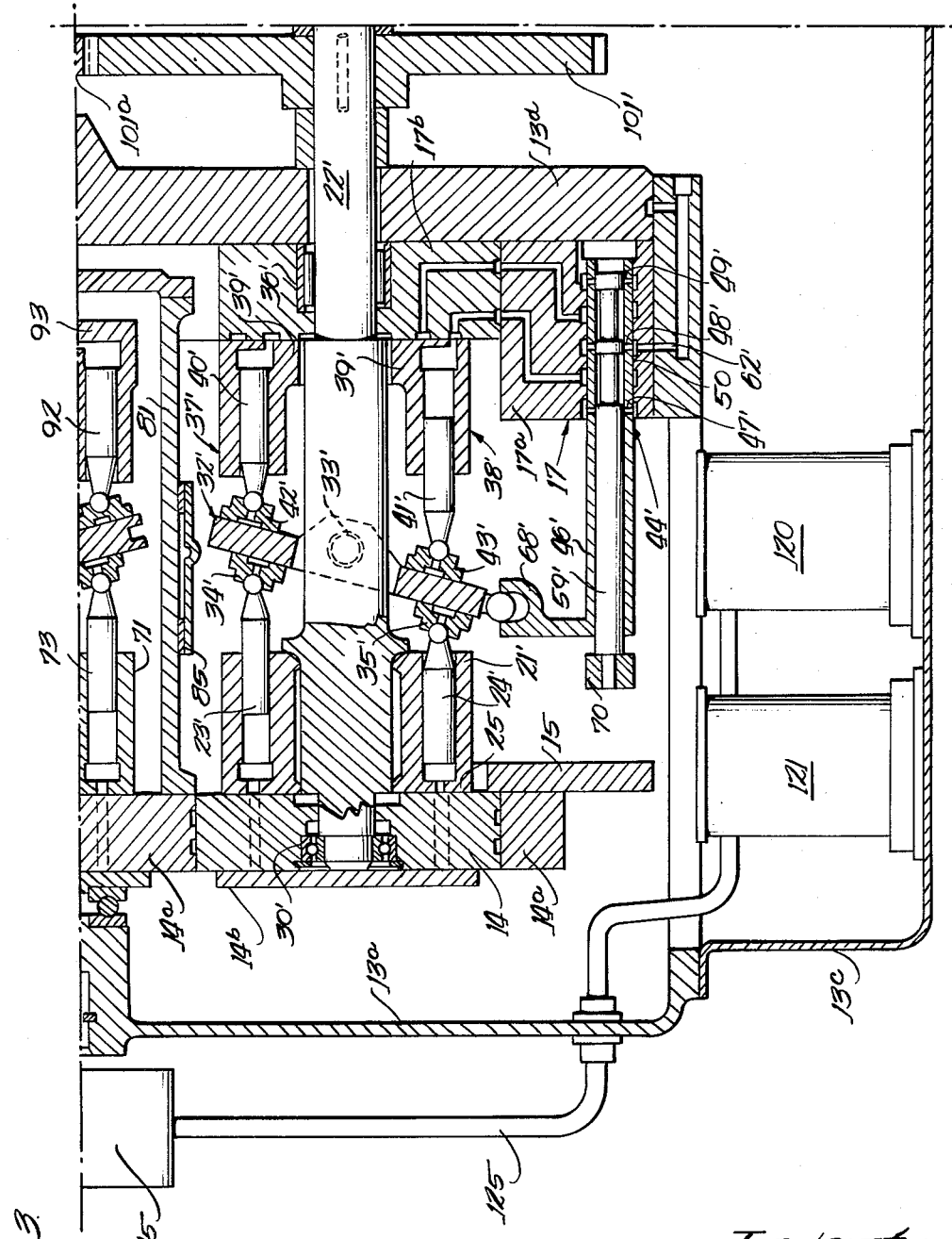

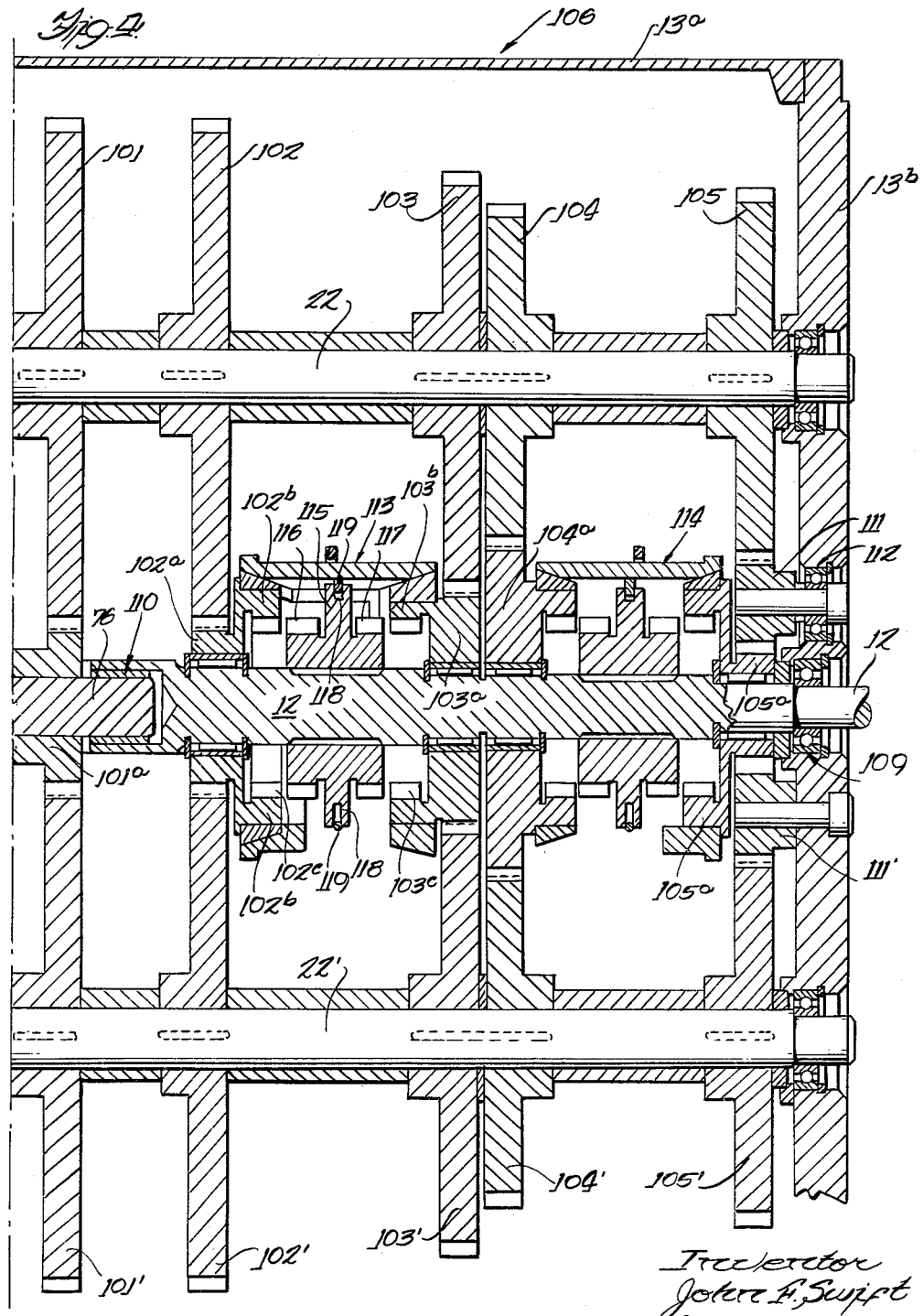

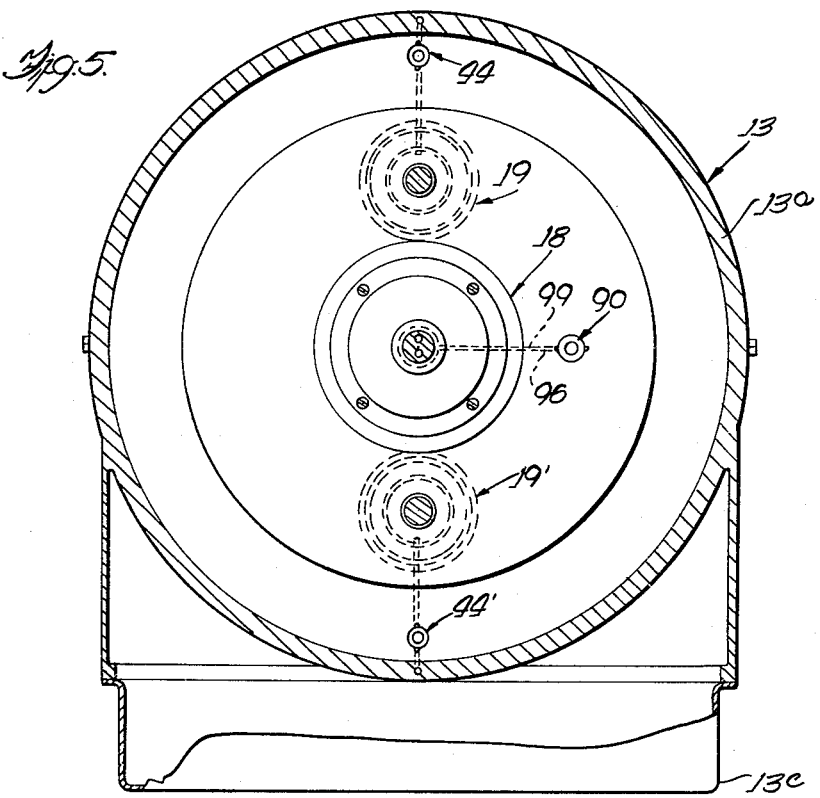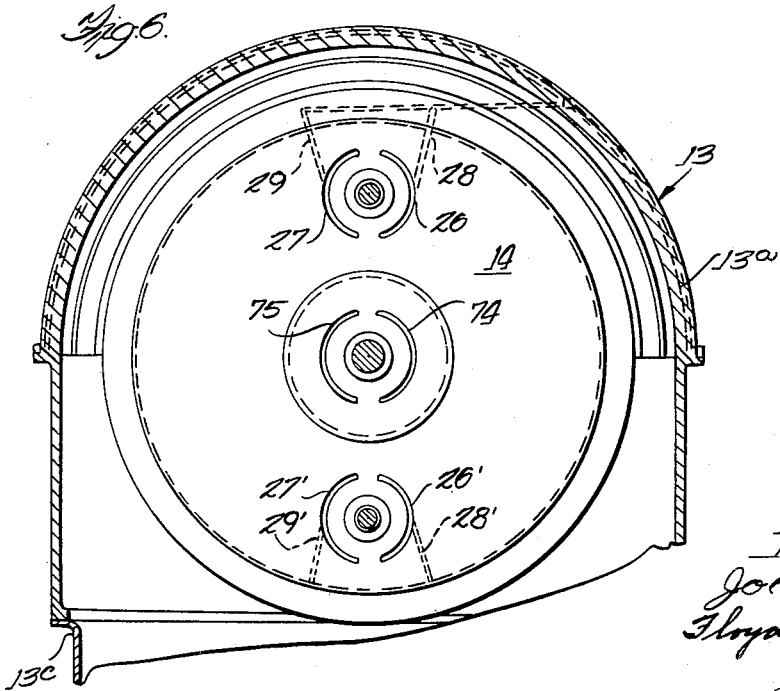

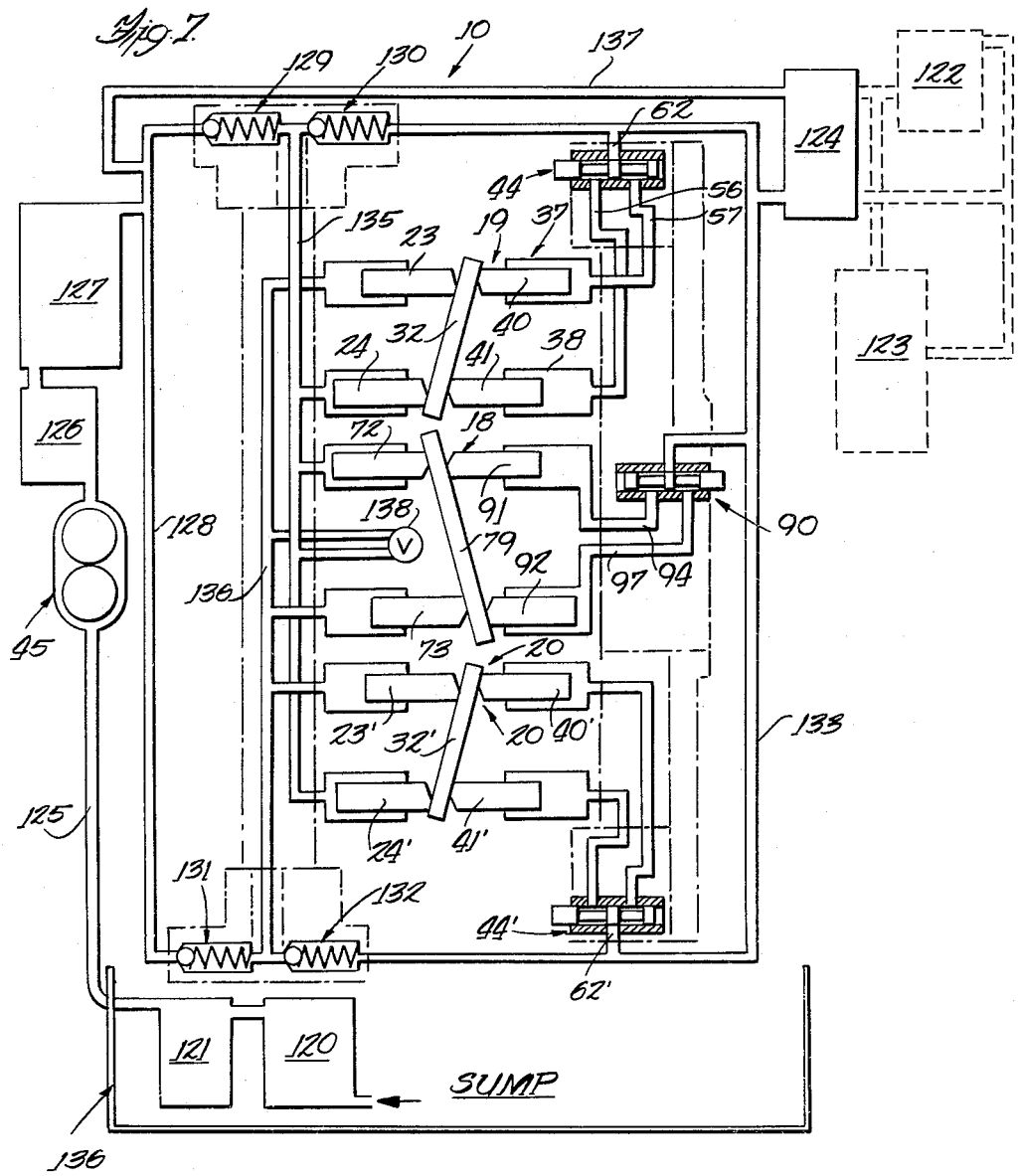

| POSITION OF SWASHPLATES | TYPE OF DRIVE | TORQUE RATIO | USING GEARBOX TORQUE RATIO "R" FORWARD R=1 | R=1⅓ | R=3 | REVERSE R=⅓ | SPEED | REMARKS |
|---|---|---|---|---|---|---|---|---|
| I, II & III | FORWARD UNDERDRIVE | $\frac{T_2}{T_1} > 3$ | $X<0$ | $X<\frac{3}{2}(1-\sqrt{3})$ | $X<-3$ | $X>6$ | FORWARD $X<0, N_2 = \frac{N_1 D_p - Q}{R(3D_p + 2D_m)}$ | Q - AVAILABLE FOR: $Q=N_1 D_p$ $N_2=0$ |
| I, II & III | | $\frac{T_2}{T_1} = 3$ | $X=0$ | $X=\frac{3}{2}(1-\sqrt{3})$ | $X=-3$ | $X=6$ | $X>0, N_2 = \frac{N_1 D_p - Q}{R(3D_p - 2D_m)}$ | FOR: $X \neq 0$ $T_2 = R(3-2X)T_1$ |
| I & II | | $3 > \frac{T_2}{T_1} > 1$ | $0<X<1$ | $\frac{3(1-\sqrt{3})}{2}<X<\frac{3-\sqrt{3}}{2}$ | $-3<X<0$ | $6>X>3$ | | FOR: $X=0$ $T_2 = 3RT_1$ MECH. TRANS. AT GEAR BOX RATIOS |
| I & II | DIRECT DRIVE | $\frac{T_2}{T_1} = 1$ | $X=1$ | $X=\frac{3-\sqrt{3}}{2}$ | $X=0$ | $X=3$ | $X=0, N_2 = \frac{N_1 D_p - Q}{3R D_p}$ | |
| I | OVER DRIVE | $1 > \frac{T_2}{T_1} > 0$ | $1<X<1.5$ | $\frac{3-\sqrt{3}}{2}<X<1.5$ | $0<X<1.5$ | $3>X>1.5$ | | |
| I | PUMPING(Q) ONLY | $\frac{T_2}{T_1}=0$ | $X=1.5$ | $X=1.5$ | $X=1.5$ | $X=1.5$ | $X=1.5$ $N_1 D_p = Q=0$ | Q $\cdot N_1 D_p$; $T_2=0$ |
| I | REVERSE OVERDRIVE | $0 > \frac{T_2}{T_1} > -1$ | $1.5 < X < 2$ | $1.5 < X < \frac{3+\sqrt{3}}{2}$ | $1.5 < X < 3$ | $1.5 > X > 0$ | REVERSE | Q - AVAILABLE |
| I & II | DIRECT DRIVE | $\frac{T_2}{T_1} = -1$ | $X=2$ | $X=\frac{3+\sqrt{3}}{2}$ | $X=3$ | $X=0$ | | SPEEDS FOR DIFFERENT VALUES OF X ARE AS AND $T_2$ ARE ABOVE IN FORWARD AS ABOVE IN FORWARD |
| I & II | | $-1 > \frac{T_2}{T_1} > -3$ | $2<X<3$ | $\frac{3+\sqrt{3}}{2}<X<\frac{3(1+\sqrt{3})}{2}$ | $3<X<6$ | $0>X>-3$ | | |
| I, II & III | UNDERDRIVE | $\frac{T_2}{T_1} = -3$ | $X=3$ | $X=\frac{3}{2}(1+\sqrt{3})$ | $X=6$ | $X=-3$ | | |
| I, II & III | | $\frac{T_2}{T_1} < -3$ | $X>3$ | $X>\frac{3}{2}(1+\sqrt{3})$ | $X>6$ | $X<-3$ | | |
| IV | HYDRAULIC BRAKING | $\frac{T_2}{T_1} = \infty$ | $X=\infty$ | | | | $D_p=0$ $N_2=\frac{Q}{2RD_m}$ | FOR $Q=0, N_2=0$ HYD BRAKING APPLICABLE |
| V | NEUTRAL | $\frac{T_2}{T_1}$ UNDEFINED | $X=\frac{D_p}{0}$ | | | | $D_m=0$ EACH UNIT CAN $D_p=0$ ROTATE INDEPENDENTLY | TRANSMISSION IS IN NEUTRAL |

1. EQUATIONS $\frac{T_2}{T_1} = R(1-rrX)$; $N_2 = \frac{N_1 D_p - Q}{N_1 R(r \cdot D_p - r^2 D_m)}$; WHERE $r=3$, $r_2=2$;   $\frac{T_2}{T_1} = R(3-2X)$;   $\frac{N_2}{N_1} = \frac{N_1 D_p - Q}{N_1 R(3D_p - 2D_m)}$.

2. NO LEAKAGE ¢ 100% MECH. EFFICIENCY ASSUMED $T_1$ - INPUT TORQUE   $D_p$ - VOLUMETRIC DISPLACEMENT PER REVOLUTION (OF PUMP)
$T_2$ - OUTPUT TORQUE   $D_m$ - VOLUMETRIC DISPLACEMENT PER REVOLUTION (OF MOTOR)
$N_1$ - INPUT SPEED   $X$ - RATIO $\frac{D_p}{D_m}$
$N_2$ - OUTPUT SPEED   $Q$ - FLUID FLOW RATE FOR EXTERNAL USE

Fig. 9 — RELATIVE POSITIONS OF SWASHPLATES

| ANGLE OF BOTH MOTOR SWASHPLATES & TANGENT $\alpha_m$ | | $\alpha_m < 0$ $\tan\alpha_m < 0$ | $\alpha_m = 0$ $\tan\alpha_m = 0$ | $\alpha_m > 0$ $\tan\alpha_m > 0$ |
|---|---|---|---|---|
| ANGLE OF PUMP SWASHPLATE & TANGENT $\alpha_p$ | BOTH MOTOR SWASHPLATES → / PUMP SWASHPLATE ↓ | $-\alpha_m$ | | $+\alpha_m$ |
| $\alpha_p < 0$ $\tan\alpha_p < 0$ | $-\alpha_p$ | I $X > 0$ | II $X = 0$ | III $X < 0$ |
| $\alpha_p = 0$ $\tan\alpha_p = 0$ | | IV $X = \infty$ | V $X = \frac{0}{0}$ | IV $X = \infty$ |
| $\alpha_p > 0$ $\tan\alpha_p > 0$ | $+\alpha_p$ | III $X < 0$ | II $X = 0$ | I $X > 0$ |

1. SWASHPLATES OF BOTH MOTORS ALWAYS IN SAME QUADRANT & AT THE SAME ANGLE ($\alpha_m$)
2. $X = \frac{D_M}{D_P} = \frac{\tan\alpha_m}{\tan\alpha_p}$ (DISPLACEMENT RATIO)

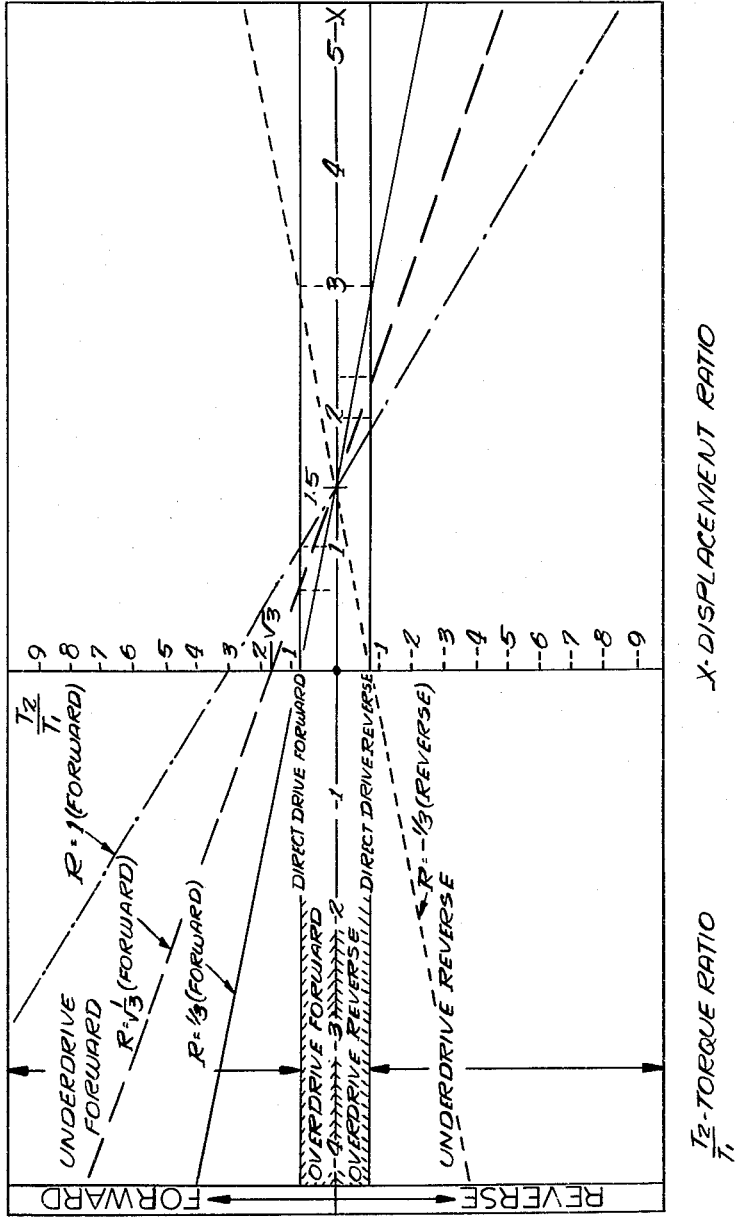

United States Patent Office 3,213,712
Patented Oct. 26, 1965

3,213,712
HYDROMECHANICAL TRANSMISSION WITH
COUNTERSHAFT GEARING
John F. Swift, Chicago, Ill., assignor to International
Harvester Company, Chicago, Ill., a corporation of
New Jersey
Filed Aug. 8, 1963, Ser. No. 300,728
10 Claims. (Cl. 74—730)

This invention relates to a hydromechanical transmission combined with a shiftable countershaft gearing. More in particular this invention relates to an infinitely variable speed hydromechanical transmission coupled with a shiftable multi-speed ratio countershaft gearing whereby the efficiency is improved over wide ranges of overall speed ratios.

A hydromechanical power transmission device differs materially from a hydrostatic power transmission device. In a hydrostatic type device the power transmission between the input shaft and output shaft of the hydraulic unit is solely dependent upon the movement of hydraulic fluid under pressure. In a hydromechanical type device the power delivered to the input shaft is split into two paths or power trains, one being hydrostatic and the other being mechanical, both power trains being combined for delivery at the output shaft of the hydraulic unit. In a conventional hydromechanical transmission when the speed of the output shaft equals the speed of the input shaft in the same direction there is no fluid flowing in the hydraulic components (hydraulic lock) and thus the entire power transmission is mechanical. From this it is apparent that the greater the deviation from 1:1 speed ratio (same direction of rotation) the greater the proportion of power transmitted hydrostatically. Owing to the fact that frictional power is lost in the flow of hydraulic fluid under pressure it follows that as the proportion of power transmitted hydrostatically increases the frictional power loss increases correspondingly and thus the overall efficiency decreases.

Now in certain types of equipment, such as a tractor, the torque and speed range requirements are wide. For example when an agricultural tractor is drawing a plow over the ground, the torque requirement is high and the vehicular speed is low. On the other hand when the same tractor is traversing a highway the torque requirement is relatively low and the vehicular speed relatively high. Thus if a conventional hydromechanical power transmission was employed it would in the one case be operated at very low speed ratio (underdrive) and at high speed ratio (overdrive) in the other case. In both cases the proportion of power transmission hydrostatically would be high and thus operating at a less favorable efficiency. From this it can be readily appreciated that if a shiftable countershaft gearing is coupled to the output of the hydromechanical unit, the hydromechanical unit can be operated in a speed range much closer to 1:1 ratio a greater percentage of the time and thus the average overall efficiency is greatly improved. Thus the vehicle may be operated from minimum to maximum speed (or torque) at substantially higher average overall efficiency (i.e., minimizing hydrostatic power loss). It is therefore a prime object of the present invention to improve the efficiency of an infinitely variable speed ratio hydromechanical power transmission over a wide range of output speeds.

It is a further object of the present invention to provide a hydromechanical power transmission having a hydromechanical unit coupled to a shiftable speed ratio countershaft gear means.

A yet further object of the present invention is to provide a hydromechanical power transmission having a hydromechanical mechanism with a pump unit and at least one motor unit coupled to a shiftable speed ratio countershaft gear means.

A still further object of the present invention is to provide a hydromechanical power transmission according to the preceding objects where the hydraulic motors are interchangeable and the gearing means also interchangeable.

Another object of the present invention is to provide a hydromechanical power transmission according to the preceding objects wherein the pump and motors are of the swash-plate type and the displacement angle of the pump swashplate is independently variable with respect to the variable displacement angle of the swashplates of the motors.

Still another object of the invention is to provide a hydromechanical power transmission according to the preceding objects wherein means are provided for delivery of fluid under pressure for power-take-off purpose.

Yet another object of the present invention is to provide a hydromechanical power transmission according to the preceding objects wherein the output shaft may be controllably braked independently of the input shaft.

Another object of the present invention is to provide a hydromechanical transmission according to the preceding objects wherein the overall ratio is the mathematical product, as distinguished from the mathematical sum, of the hydraulic and mechanical ratios.

These and other desirable and important objects inherent in and encompassed by the invention will be more readily understood from the ensuing description of a preferred embodiment, the appended claims and the annexed drawings wherein:

FIGURE 1 is a side elevation taken along the longitudinal axis of the transmission, in section and partly broken away, showing the arrangement of components of the invention in assembled form;

FIGURES 2, 3 and 4 compositely illustrate FIGURE 1 showing the various components enlarged and in greater detail;

FIGURE 5 is a sectional view, partly broken away, taken on line 5—5 of FIGURE 1, showing the relative positions of the hydraulic pump and hydraulic motors in the assembly;

FIGURE 6 is a sectional view, partly broken away, taken on line 6—6 of FIGURE 1, showing a portion of the valving and porting of the pump and motors;

FIGURE 7 is a schematic diagram of the hydraulic circuit systems of the transmission of FIGURE 1; and FIGURES 8, 9 and 10 are charts showing in summary form the theoretical characteristics attainable for various operating conditions of the particular embodiment of the invention illustrated in FIGURES 1 to 7.

Referring now to the drawing the numeral 10 in FIGURE 1 indicates a hydromechanical transmission including a multi-shift countershaft gearing. The transmission 10 is provided with a power input shaft 11, a power output shaft 12 and a housing generally indicated at 13 as illustrated. For assembly reasons the stationary housing 13 may be comprised of a main section 13a, a closure member 13b, a hydraulic fluid sump 13c and a wall member 13d all connected together as shown in rigid relation as by conventional screws or bolts (not shown). Mounted within the housing 13 in rigid relation is an annulus 14 which for manufacturing convenience in providing fluid passages includes an outer ring 14a secured in concentric relation as by welding. In addition, for similar reasons, another but smaller ring 14b is secured in rigid relation to the annulus 14. Also secured in rigid relation to the main section 13a of the housing 13 as by bolts (not shown) is a generally annular shaped bolster member 15 which abuts upon the annulus 14a and a shoulder 16 of the housing 13 as shown in FIGURES 1 and 2.

Rigidly secured as by bolts (not shown) to the main section 13a and abutting wall 13d of the housing 13 is an annular shaped member generally indicated at 17 which for manufacturing means may conveniently consist of an outer ring 17a secured rigidly, as by welding, to an inner ring 17b in concentric relation as shown in FIGURE 1.

From FIGURE 1 it will be seen that the hydraulic portion of the transmission 10 includes a pump unit generally indicated at 18 disposed coaxially with respect to the input shaft 11 and output shaft 12 and hydraulic motors 19 and 20 positioned in 180° relation with respect to each other as shown. The construction of motor 19 is identical with the construction of the motor 20 and thus motor 19 will be described in detail except that corresponding parts of the motor 20 are designated with like numerals primed in the drawings.

The motor 19 includes a rotatable barrel 21 in keyed relation with a countershaft 22 and thus constrained for rotation together. The barrel 21 is provided with a plurality of cylinders including pistons in circumferential spaced relation two of which are shown at 23 and 24 in FIGURES 1 and 2. The barrel 21 rotatably abuts one face 25 of the stationary annulus 14 as seen best in FIGURE 2. The annulus 14 is provided with the conventional crescent shaped valve ports 26 and 27, commonly referred to as "kidney valves" in the art, which communicate fluid to and from the cylinders (e.g., 23 and 24) in the barrel 21 through suitable passages 28 and 29, respectively, as indicated in FIGURE 6. At this point it will be noted that the countershaft 22 is supported and journalled for rotation by bearings 30 and 31 in the annulus 14 and closure member 13b of the housing 13, respectively. In addition bearing 36 on the stationary inner ring 17b rotatably supports the countershaft 22 as indicated in FIGURES 2 and 3.

The motor 19 includes a swashplate indicated at 32 which is non-rotative with respect to the countershaft 22 but concentric thereto. The swashplate 32 is pivotally supported on a pair of pins, one of which is indicated at 33 in dotted lines in FIGURE 2, the pins being mounted on the housing 13 in 180° relation as is conventionally known. Thus it is apparent that the swashplate 32 may rotate several degrees in either direction from the vertical, as viewed in FIGURE 2, about the transverse axis of pin 33. Each of the pistons (e.g., 23 and 24) in the barrel 21 is provided with a shoe, two of which are shown at 34 and 35, in slidable relation with one face of the swashplate 32 as is evident in FIGURES 1, 2 and 3. Now it will be appreciated that if the swashplate 32 is held at any angle greater than zero with respect to the vertical and high fluid pressure is delivered to one of the valve ports 26 or 27, the other valve port being at low pressure, the cylinders (e.g., 23) communicating with the high pressure valve port exerts a reactive force on the swashplate 32. Since the swashplate 32 is non-rotative with respect to the countershaft 22, the reactive force rotates the barrel 21 and its associated conutershaft 22 as a motor in the manner conventionally known. Means will now be described for selectively controlling the angular displacement of the swashplate 32 which in turn determines the fluid displacement of the motor 19.

Secured rigidly, as by welding, to the stationary inner ring 17b is a pair of swashplate hydraulic control rams indicated generally at 37 and 38 comprising a stationary casing 39 and axially slidable pistons 40 and 41 as shown in FIGURE 2. The ram 37 is positioned in 180° relation with respect to the ram 38 and in the plane coinciding with the axes of pistons 40 and 41 which plane is perpendicular to the axis of stationary pins 33 supporting the swashplate 32. Since the outer ends of pistons 40 and 41 are provided with shoes 42 and 43, respectively, it is apparent that by controlling the rams 37 and 38 the angular displacement of the swashplate 32 with respect to the vertical may be selectively controlled. Means for controlling the rams 37 and 38 will now be described.

It will be seen from FIGURE 2 that the hydraulic motor unit 19 is provided with a servo-valve generally indicated at 44 which is fully described in my copending application filed on February 15, 1962, under Serial No. 173,392, now Patent No. 3,151,456. Briefly, the servo-valve 44 is positioned in the annular shaped member 17 and comprises a sleeve member 46 slidable within a bore 50 in the stationary member 17 as shown. The sleeve 46 is provided with transverse ports 47, 48 and 49. The bore 50 is provided with annular grooves 51, 52, 53, 54 and 55 as indicated. Grooves 51 and 55 communicate for drain to the sump 13c while groove 52 communicates with ram 38 through passage 56 and annular groove 58, and groove 54 communicates with ram 37 through passage 57. Groove 53 communicates with a source of fluid pressure through port 62 derived from either the charge pump 45 or the hydraulic working circuit between the pump 18 and motors 19 and 20 (whichever is of greater pressure) as will be later explained herein.

Within the valve sleeve 46 in slidable relation is a control valve element 59 which is of the spool type having circumferential grooves 60 and 61 and lands 63, 64 and 65. In the position shown in FIGURE 2 the spool 59 is in neutral position as the land 64 is in registry with port 48 and groove 53. Since the circumferential groove 60 is not in communication with any port except port 66 leading to ram 38 through groove 52, passage 56 and annular groove 58, the ram 38 is under hydraulic lock. Similarly ram 37 is also under hydraulic lock for circumferential groove 61 only communicates with ram 37 through port 67, groove 54 and passage 57. Thus the rams 37 and 38 are hydraulically locked as shown in FIGURE 2.

In FIGURE 2 it is seen that the sleeve 46 is provided with a lug or U-shaped projection 68 engaged with ball 69 of swashplate 32 in slidable relation. Thus it will be apparent that any change in angular displacement of the swashplate 32 results in a corresponding axial movement of the valve sleeve 46. In other words, the valve sleeve 46 senses any change in angular displacement of the swashplate 32. At this point it should be understood that the lug 68 does not exert any force upon the ball 69 of the swashplate 32 but only senses the position of the swashplate 32. The operation of the servo-valve 44 will now be described.

When it is desired to change the angular displacement of the swashplate 32, the valve element or spool 59 is shifted axially by external force which may be manual power or otherwise. If it is moved to a new position leftwardly from that shown in FIGURE 2, the land 64 moves out of registry with respect to port 48 and thus charges circumferential groove 61 with fluid under pressure from port 62. Charging of groove 61 with fluid under presure energizes ram 37. At the same time land 63 moves out of registry with respect to port 47 thereby communicating the circumferential groove 60 with drain through annular groove 51. This now permits the ram 38 to exhaust and thus the swashplate 32 moves in a counterclockwise direction. As the swashplate 32 moves counterclockwise it correspondingly moves the lug 68 and its associated valve sleeve 46 leftwardly until the sleeve 46 reaches the same relative relation with respect to spool 59 shown in FIGURE 2 at which time both rams 37 and 38 will again be under hydraulic lock thereby securing against further movement the swashplate 32. It will thus be apparent that the angular displacement of the swashplate 32 is a function of the axial position of the control valve element 59. It will also be apparent that any change in the position of the swashplate 32 due to hydraulic leakage or otherwise is immediately reflected in the position of the sleeve 46 whereby the rams 37 or 38 become energized in a corrective direction.

Now in the embodiment disclosed the angular displacement of the swashplate 32 must be the same as the angular displacement of swashplate 32' of motor 20. In order to accomplish this the outer ends of control valve elements 59 and 59' are rigidly connected to an annular ring 70. Thus an axial movement of control valve element 59 of motor 19 also correspondingly moves control valve element 59' of motor 20. Therefore an external force shifting axially the ring 70 correspondingly shifts the annular displacement of swashplates 32 and 32' of both motors 19 and 20 and thus the fluid displacement of motor 19 is always the same as that of motor 20. The description of the pump 18 will now be undertaken.

Referring to FIGURES 1, 2 and 3 the pump 18 includes a rotatable barrel 71 in keyed relation with the input shaft 11 and thus constrained for rotation together. The barrel 71 is provided with a plurality of cylinders including pistons in circumferential spaced relation, two of which are shown at 72 and 73. The barrel 71 rotatably abuts the face 25 of the stationary annulus 14 as seen best in FIGURE 2. The annulus 14 is provided with the conventional crescent shaped valve ports 74 and 75, (kidney valves in FIGURE 6) which communicate fluid to and from the cylinders (e.g., 72 and 73) in the barrel 71 through suitable passages in the annulus 14, 14' with the motors 19 and 20 as indicated in the diagram of FIGURE 7 which will be explained later herein.

Coaxial with the input shaft 11 is a pump reaction shaft 76 supported in journalled relation by a bearing 77 in the input shaft 11 and bearing 78 in the wall 13d. In order to actuate the pistons of the pump cylinders in the barrel 71, a swashplate 79 is mounted on the reaction shaft 76 in pivotal relation at 80. Thus the swashplate 79 is constrained for rotation with the reaction shaft 76 and also may be rotated several degrees about the transverse axis of pivot 80. From this it will be apparent that the effective displacement of the pistons in the cylinders (e.g. 72 and 73) of the barrel 71 for pumping is dependent upon the relative speed of rotation of the reaction shaft 76 with respect to the input shaft 11 and the angular displacement of the swashplate 79. Means for controlling the angular displacement of the pump swashplate 79 will now be described.

Constrained for rotation with the pump reaction shaft 76 is a bell-shaped member 81 of generally cylindrical form as seen in FIGURES 1 and 2. Adajcent the pump swashplate 79 the bell-shaped member 81 is provided with three longitudinally disposed elongated slots, one of which is shown at 82 in FIGURES 1 and 2. The elongated slots 82 extend transversely through the member 81 in equilateral relation; in other words 120° apart in circumferential spacer relation. Also the elongation of the slots 82 are in the axial direction. Within each of the three slots is an axially slidable element 83 which elements rotate with the bell-shaped member 81 as best seen in FIGURE 2. Each of the elements 83 is provided with an outwardly extending ball 84 in pivotal engagement with an annular shaped collar 85. The collar 85 is thus concentrically disposed about the bell-shaped member 81 but is slidable in an axial direction with the elements 83. Bearing metal 86 may be employed if desired to reduce friction in the axial movement of the collar 85 with respect to the bell-shaped member 81. It will be apparent that the reason for employing three slidable elements 83, in slots 82, connected to the collar 85, is to minimize resistance to axial movement or binding of the collar 85.

Disposed on one of the slidable elements 83 is an inwardly projecting finger 87 which extends into a radially positioned hole or socket 88 in the outer periphery of the pump swashplate 79. From this it can be seen from FIGURE 2 that a change in the angular displacement of the swashplate 79 mechanically transmits corresponding axial movement of the collar 85.

The collar 85 is provided with an annular projection 89.

Since, as above explained, the axial position of the collar 85 is determined by the angular displacement of the pump swashplate 79, it can be appreciated that the axial movement of the annular projection 89 may be employed to sense the angular displacement of the swashplate 79. Now the pump 18 is provided with a servo-valve, indicated at 90 in FIGURE 5, for controlling the angular displacement of swashplate 79. The servo-valve 90 is constructed the same as servo-valves 44 and 44' previously described and its lug or U-shaped member (like 68) of its associated sleeve member (like 46) engages the annular projection 89 of collar 85. Thus the sleeve member of the control servo-valve 90 is in sensing relation with the angular position of the pump swashplate 79.

Similar to the motors 19 and 20, the pump 18 is provided with a pair of hydraulic rams 91 and 92 disposed in a casing 93 as best seen in FIGURE 2. The casing 93 is constrained for rotation with the pump reaction shaft 76. The ram 91 is positioned in 180° relation with respect to ram 92 and the plane coincidental with the axes of rams 91 and 92 is perpendicular to the pivotal axis 80 of swashplate 79. Thus it is apparent that the angular displacement of the swashplate 79 may be selectively positioned by controlling rams 91 and 92 as evident from FIGURE 2. The hydraulic connection between the ram 91 and the pump servo-valve 90 is through fluid passage 94 in casing 93 and reaction shaft 76 to annular groove 95 in the shaft 76. The groove 95 is in registry with a passage 96 in the wall 13d as indicated in dotted lines in FIGURES 2 and 5. The passage 96 connects with the servo-valve 90 in the same manner as passage 56 connects with servo-valve 44 for motor 19. Similarly the ram 92 communicates with servo-valve 90 through passage 97 and annular groove 98 in shaft 76 and passage 99 in wall 13d. It should be emphasized that while the servo-valves 44 and 44' operate in unison through integral control in order to maintain the angular displacement of the motors swashplates 32 and 32' equal to each other, the angular displacement of the pump swashplate 79 is controlled through servo-valve 90 independently of the motor swashplates. Further details for controlling the angular displacement of the pump swashplate 79 are shown in my aforementioned copending application.

The construction of the pump 18 and motors 19 and 20 including controls therefor in the present embodiment of the invention have now been described. However, it is pointed out that the construction per se of pump 18 and motors 19 and 20 do not comprise the novel features of the present invention. It will suffice to say that conventional pumps and motors having the same general characteristics as those described above may be employed instead if desired. This will become more apparent as the discussion of the proposed form of the invention continues. The multi-ratio change speed gear mechanism 106 will now be described.

Referring now to FIGURES 1 and 4 it will be seen that operationally the countershafts 22 and 22' may be integral. As a practical matter each of the countershafts are in two sections employing splined couplings 100 and 100' respectively as shown in FIGURE 1. Constrained for rotation with countershaft 22 are gears 101, 102, 103, 104 and 105. Similarly constrained for rotation with countershaft 22' are gears 101', 102', 103', 104' and 105' as shown. The input shaft 11 is supported rotatably by bearing 107 in housing section 13a and alined bearing 108 in the stationary annulus 14'. The output shaft 12 is rotatably supported by bearing 109 in the stationary closure member 13b and bearing 110 engaged in support relation with the protruding end portion of the pump reaction shaft 76. Thus shafts 11, 12, 22, 22' and 76 are all rotatably supported.

Constrained for rotation with the pump reaction shaft 76 is pinion 101a positioned in meshed relation with gears 101 and 101' as shown in FIGURE 4. Thus both countershafts 22 and 22' are in geared relation with the pump reaction shaft 76 at all times. Now the gears 101 to 105 are of sizes chosen to driven the output shaft 12 at speeds most commonly used assuming that the hydraulic unit is in 1:1 speed ratio, that is to say the speed of the pump reaction shaft 76 is equal to the speed of the input shaft 11. The corresponding sizes of gears 101' to 105' should be the same as that for gears 101 to 105 so that the speed of countershaft 22 is always equal to that of countershaft 22'.

Mounted on and in journalled relation with respect to the output shaft 12 are pinions 102a, 103a, 104a and 105a. Pinion 102a is positioned in meshed relation with gears 102 and 102'. Similarly pinion 103a meshes with gears 103 and 103' and pinion 104a meshes with gears 104 and 104'. The gears 105 and 105' are for reverse drive and thus are provided with intermediate pinions 111 and 111' as shown. The pinion 111 is supported by bearing 112 mounted on closure member 13b. Similarly pinion 111' is rotatably supported by closure member 13b.

As seen in FIGURE 4 the pump reaction shaft 76 is always in geared relation with both countershafts 22 and 22' which in turn are in geared relation with pinions 102a, 103a, 104a, 105a, 111 and 111'. However in the position (neutral position) illustrated in FIGURE 4 there is no drive relation with the output shaft 12. Means will now be described for separately engaging each of the pinions 102a, 103a, 104a or 105a with the output shaft 12 thereby engaging the countershafts 22 and 22' drivingly to the output shaft 12.

Referring again to FIGURE 4 it will be seen that mounted on the output shaft 12 are a pair of clutch devices generally indicated at 113 and 114. Clutch 113 comprises a gear 115 splined to the output shaft 12 in axially slidable relation. The gear 115 is provided with gearing teeth 116 and 117 and a centrally disposed annular groove 118. In slidable relation within the groove 118 is a stationary shift fork or yoke member 119. The pinion 102a is provided with a ring gear 102b having gear teeth 102c positioned in axial alinement with gear teeth 116 of gear 115. Similarly pinion 103a is provided with ring gear 103b having gear teeth 103c positioned in axial alinement with gear teeth 117 of gear 115. It thus becomes apparent that if yoke member 119 is shifted leftwardly as viewed in FIGURE 4, the teeth 116 engage teeth 102c thereby connecting the countershafts 22 and 22' in drive relation with respect to the output shaft 12 through gears 102, 102' pinion 102a and its associated ring gear 102b, and gear 115. Alternately the yoke member 119 may be shifted rightwardly whereby the countershafts 22 and 22' are in drive relation with the output shaft 12 through gears 103, 103', pinion 103a and its associated ring gear 103b, and gear 115. However, it will be equally apparent from FIGURE 4 that the gear ratio when pinion 102a is coupled to gear 115 is different than when pinion 103a is coupled with gear 115. The clutch device 114 is constructed identical with that of clutch 113 above described. However, it should be noted that only one of the clutches 113 or 114 may be shifted into engaged relation at any time. Since gears 102, 103 and 104 are of different diameters, it will be apparent that the gear ratio between countershaft 22 may be any of three corresponding values in the forward direction and engagement with gear 105 reverses the direction of the output shaft 12. The clutch devices 113 and 114 are conventional as well as the entire multi-ratio change-speed gear mechanism 106.

From the foregoing it will be apparent that the pump 18, motors 19 and 20, charge pump 45, servo-valves 44, 44' and 90, change speed gear mechanism 106, oil strainer 120, and oil filter 121 as individual components do not comprise the novel features of this invention. To the contrary it is the arrangement in co-active relation of all of these aforementioned components which combinedly produce the novel features of this invention. The hydraulic flow circuitry of the transmission 10 will now be described.

Referring now to FIGURE 7 it will first be assumed that the pump swashplate 79 and motor swashplates 32 and 32' are in vertical position (i.e., zero fluid displacement) and thus no reciprocation of cylinders 23, 23', 24, 24', 72 and 73 occurs. In this condition rotation of the input shaft 11 delivers no power to the output shaft 12. Since there is no reciprocation of the pump cylinders 72 and 73, it is at once evident that the only fluid pressure in the system is derived from the charge pump 45 which is drivenly connected to the input shaft 11. Now in FIGURE 7 there is indicated in dotted lines hydraulically operated accessories such as for example hydraulic motor 122 and a hydraulic ram 123. These accessories such as motor 122 and ram 123 are energized by fluid power take-off from the transmission 10 and are controlled by a conventional control valve mechanism indicated at 124.

As the power input shaft 11 rotates, the charge pump 45 draws fluid from the sump 13c through strainer 120 and filter 121 and conduit 125 to the inlet side of the pump 45. Fluid under pressure from the discharge side of pump 45 passes through conventional filter 126 and heat exchanger 127, if desired, and thence into conduit 128. From conduit 128 the fluid passes through check valves 129, 130, 131 and 132 into conduit 133. The general location of check valves 129, 130, 131 and 132 is indicated in dotted lines at 134 in FIGURE 2. Fluid pressure in conduit 133 from charge pump 45 is now available to the servo-valves 44, 44' and 90 for energizing the swashplate control rams 37, 37', 38, 38', 91 and 92 assuming that the fluid power take-off control valve 124 is in closed position. At this point it will be observed that no fluid flow occurs in conduits 135 and 136 for, as above stated, the pump 18 and motors 19 and 20 are at zero displacement.

It will now be assumed that the servo-valves 44, 44' and 90 have been operated to shift the swashplates 44, 44' and 90 into positions such as that illustrated in FIGURE 7. The pump 18 will now deliver fluid at high pressure into conduit 135 or 136 depending upon the direction of rotation of the input shaft 11. For purpose herein it will be assumed that the pump 18 delivers fluid at high pressure into conduit 135 and thus the return line or low pressure is through conduit 136. At this point the check valve 129 closes for the pressure in conduit 135 is now much higher than in the charge pump conduit 128. Fluid pressure in the conduit 133 by reason of open check valve 130 is now equal to the pressure in conduit 135 and thus the pressure available to the servo-valves 44, 44' and 90 is correspondingly increased. It will be understood that except for a small amount of fluid pressure expended during operation of the servo-valves 44, 44' and 90 there is no fluid flow in conduit 133 at this time. The pump 18 therefore delivers its entire output to the motors 19 and 20 and thus the motors 19 and 20 are energized equally for it must be remembered that the construction of the two motors are the same and their displacements are always equal to each other as previously explained. Energization of motors 19 and 20 therefore drives the countershafts 22 and 22' as previously explained. However, the resistance to flow of fluid from the pump 18 to motors 19 and 20 creates a reactive torque on the pump reaction shaft 76 which is also in drive relation with countershafts 22 and 22' through pinion 101a and gears 101 and 101'. Now by selective operation of one of the clutches 113 and 114 the countershafts 22 and 22' are connected in drive relation to the output shaft 12 in low speed ratio, intermediate speed ratio, high speed ratio, or reverse speed ratio as previously explained.

Now it will be appreciated that if the swashplate 79 of the pump 18 is positioned for displacement other than zero, such as at the angular displacement illustrated in FIGURE 7, and the motor swashplates 32 and 32' are positioned vertical (i.e., zero displacement) the motors 19 and 20 will not accept fluid from the pump 18 through conduit 135 nor deliver return fluid at low pressure into the conduit 136. This then creates a hydraulic lock for there is no fluid flow except for leakage and thus the pump reaction shaft 76 will be driven at the same speed as that of the input shaft 11 (i.e., 1:1 speed ratio). The drive to the multi-ratio change-speed gear mechanism or gear box 106 is then confined entirely to the torque delivered by the pump reaction shaft 76. Therefore the speed ratio between the input shaft 11 and output shaft 12 is a direct function of the selected gear ratio of the change-speed gear mechanism 106 when the pump reaction shaft 76 is in 1:1 speed ratio with respect to the input shaft 11. As will be seen later herein the countershafts 22 and 22' may be driven hydraulically at infinitely variable speed ratio from overdrive or underdrive in one direction to underdrive or overdrive in the opposite direction. However, maximum efficiency occurs when the pump reaction shaft 76 is in direct drive with respect to the input shaft 11 for there is no fluid movement in such condition.

When accessories 122 or 123 are operated, the fluid under pressure is taken from conduit 133 and returned through conduit 137 to conduit 128, thence through check valve 131 to low pressure conduit 136. Make-up fluid to replace leakage is derived from sump 13c and charge pump 45 into conduit 128, thence to the low pressure conduit 136 through check valve 131. From this it is apparent that the charge pump 45 performs two basic functions, first to replenish fluid lost through leakage and second to provide fluid pressure for initially displacing the swashplates from their neutral or vertical positions.

*Performance characteristics*

The following discussion is based on theoretical characteristics and therefore assumes no frictional losses or fluid leakage. Furthermore the following discussion includes general mathematical equations as well as particular equations relating to selected design parameters specific to the embodiment of the transmission 10 shown in the drawings.

The displacement volume per revolution of the pump and each motor is:

For each hydraulic motor:

$$D_m = L_m a_m d_m \tan \alpha_m \quad (1)$$

For the pump:

$$D_p = L_p a_p d_p \tan \alpha_p \quad (2)$$

$$x = \frac{D_m}{D_p} = \frac{L_m a_m d_m \tan \alpha_m}{L_p a_p d_p \tan \alpha_p} \quad (3)$$

where $D_m$=Volumetric displacement per revolution of one motor (cu. in./rev.).
$D_p$=Volumetric displacement per revolution of one pump (cu. in./rev.).
$L_m$=No. of pistons in one motor.
$L_p$=No. of pistons in one pump.
$a_m$=Cross-sectional area of one motor piston (sq. in.).
$a_p$=Cross-sectional area of one pump piston (sq. in.).
$d_m$=Diameter of circular path formed by the axes of the rotating motor pistons, in.).
$d_p$=Diameter of circular path formed by the axes of the rotating pump pistons (in.).
$x$=Displacement ratio of one motor and one pump, i.e., ratio of volumetric displacement of one motor to volumetric displacement of one pump.
$\alpha_m$=The angle that each motor swashplate makes with respect to the vertical.
$\alpha_p$=The angle that the pump swashplate makes with respect to the vertical.

In the embodiment illustrated in the drawings $$L_m = L_p;\ a_m = a_p;\ \text{and}\ d_m = d_p$$

Thus Equations 1, 2 and 3 reduce to:

$$x = \frac{D_m}{D_p} = \frac{\tan \alpha_m}{\tan \alpha_p} \quad (4)$$

The speed ratio of the transmission is determined in accordance with certain considerations summarized below.

First the flow of fluid from the pump must equal the fluid flow accepted by the motors plus the fluid flow for external use (fluid power take-off). The general equation expressing this relation is:

$$N_p D_p = \sum_0^n N_m D_m + Q \quad (5)$$

where $N_p$=the effective speed of the pump (r.p.m.) which is the speed of the input shaft (N1) less the speed of the pump reaction shaft ($N_a$) in r.p.m.
$N_m$=speed of each motor in revolutions per minute (r.p.m.).
$Q$=fluid flow rate for external use (cu. in./min.).
$n$=number of motors.

In the embodiment shown in the drawings both motors 19 and 20 are identical and the gear ratios between the pump reaction shaft 76 and the motor shafts 22 and 22' are also identical. The above Equation 5 therefore assumes the form:

$$N_p D_p = n N_m D_m + Q \quad (6)$$

The pump reaction shaft 76 is in drive relation with motor shafts 22 and 22' through pinion 101a meshed with gears 101 and 101' in fixed speed ratio designated $r$. Therefore:

$$r = \frac{N_a}{-N_m} \quad (7)$$

where:

$N_a$=speed of pump reaction shaft 76 in r.p.m.

The minus sign in Equation 7 denotes that the motor output shafts 22 and 22' rotate in opposite direction to the rotation of the pump reaction shaft.

The motor output shafts 22 and 22' drive the transmission's output shaft 12 through change-speed gearing 106 in accordance with the following equation:

$$N_m = -R N_2 \quad (8)$$

where $N_2$=speed of the output shaft 12 in r.p.m.
$R$=speed ratio of the gearing between the motor shafts 22 and 22' and output shaft 12.

In the embodiment shown in the drawings the following values for gear speed ratios were chosen:

$n=2$, two motors 19 and 20
$r=3$, fixed ratio of pinion 101a with gears 101 and 101'.
$R=\frac{1}{3}$ when pinion 102a is clutched with output shaft 12 (forward direction).

$$R \sqrt{\frac{3}{3}}$$

when pinion 103a is clutched with output shaft 12 (forward direction)
$R=1$ when pinion 104a is clutched with output shaft 12 (forward direction)
$R=-\frac{1}{3}$ when pinion 105a is clutched with output shaft (reverse direction).

In addition both motors 19 and 20 and pump 18 are identical as to size, number and stroke distance of their respective pistons. Further, both motor swashplates 32 and 32' are always in the same quadrant and at the same angle ($\alpha_m$).

The effective speed of the pump ($N_p$) of Equation 6 may now be written as:

$N_p = N_1 - N_a;\ N_a = -rN_b;\ N_b = -RN_2.$
$N_p = N_1 - rRn_2;\ N_m = N_b = -RN_2.$
$N_p = N_1 - N_a = N_1 - RrN_2.$  (9)

where $N_b$ = the speed of motor output shaft.

and the speed of motor:

$N_m = -RN_2$ and thus Equation 6 may be expressed:

$(N_1 - rRN_2)D_p = -nRN_2D_m + Q$ or in ratio form:

$$\frac{N_2}{N_1} = \frac{N_1D_p - Q}{N_1R(rD_p - nD_m)} = \frac{N_1D_p - Q}{N_1RD_p(r - nx)} \quad (10)$$

where $$x = \frac{D_m}{D_p}$$

Equation 10 expresses a definition of the speed ratio between the output shaft 12 ($N_2$) with respect to the input shaft 11 ($N_1$) of the transmission. The Equation 10 may also be expressed in inverted form thusly:

$$\frac{N_1}{N_2} = \frac{N_1RD_p(r - nx)}{N_1D_p - Q} \quad (11)$$

The torque output available on the output shaft 12 where no fluid is employed for external use (i.e., no fluid power take-off) is derived as follows:

Equation 11 where $Q = 0$ then becomes $$\frac{N_1}{N_2} = R(r - nx) \quad (12)$$

and consequently the torque ratio becomes $$\frac{T_2}{T_1} = \frac{N_1}{N_2} = R(r - nx) \quad (13)$$

where $T_1$ = torque of input shaft 11.
$T_2$ = torque output shaft 12.

At this point it should be observed that the value of $x$ may be zero, less than zero, or greater than zero depending upon the angular displacement of the pump and motor swashplates (angles $\alpha_m$ and $\alpha_p$).

From the above and from FIGURE 9 it will be seen that, in the hydraulic portion of the transmission, five relative positions of pump swashplate 79 with respect to motor swashplates 32, 32' positions are possible. For the parameters selected for illustration in the embodiment shown in the drawing, the output shaft 12 will be driven by the input shaft 11 in accordance with the operational performance chart of FIGURE 8.

The torque ratio characteristics of the transmission 10 shown in the drawings are illustrated for swashplate positions I, II and III of FIGURE 9 ($Q = 0$), in FIGURE 10. In the chart of FIGURE 10 there are shown four convergent lines representing the four gear box ratios of the multiratio change-speed gear mechanism 106 of FIGURE 4. Thus, for example, if clutch device 113 of FIGURE 4 is actuated to couple the gear 102a with output shaft 12 then the line $R = \frac{1}{3}$ (forward) of FIGURE 10 would be applicable to determine the operational characteristics of the transmission 10 for that particular selected ratio of the multi-ratio change speed gear mechanism 106. Since the torque ratio is inversely proportional to the speed ratio as seen from Equation 13, it will be apparent that for negative values of $x$ (position III of FIGURE 9) the output shaft 12 will be driven at high torque but at speeds below the speed of the input shaft 11 (underdrive). If the motor swashplates are shifted to zero displacement (vertical) position and the pump swashplate is in either quadrant (i.e., displacement of pump not equal to zero) then position II of FIGURE 9 exists wherein $x = 0$. In such case there is no fluid movement assuming the fluid power take-off (Q) is zero and thus the pump reaction shaft 76 is hydraulically locked to the input shaft 11 and rotates therewith. Thus from FIGURE 10 for the line $R = \frac{1}{3}$ the output shaft 12 will rotate in the forward direction at the same speed as that of the input shaft 11 and the torque ratio is equal to 1.

Now again referring to the line $R = \frac{1}{3}$ (forward) in FIGURE 10, as the value of $x$ becomes positive the torque ratio becomes less than 1 and thus the speed ratio is greater than 1 (overdrive) until the value of $x$ approaches 1.5 wherein the torque ratio approaches zero and the speed ratio theoretically approaches infinity. As a practical matter, the resulting high speed ratio increases the frictional losses to a point where the frictional losses equal the power delivered to the input shaft 11 and thus no power is delivered to the output shaft 12. From this it is apparent that if the swashplates were set wherein the value of $x$ is equal to 1.5 the pump 18 will pump fluid only for power take-off (i.e., $Q \neq 0$) with no power being delivered to the output shaft 12. Thus if $x = 1.5$ and $Q = 0$ the input shaft 11 would be hydraulically locked against rotation. In other words the pump 18 would function solely for power take-off (Q).

Now if the value of $x$ is increased above the value of 1.5 but less than 3, the speed ratio would be less than $-1$ and thus the output shaft 12 rotates in reverse direction at overdrive speed (i.e., at a speed greater than that of the input shaft 11 but in reverse direction). When the value of $x$ equals 3, the speed ratio will be 1:1 but the output shaft 12 rotates in reverse direction. For values of $x$ greater than 3 the output shaft 12 rotates in the reverse direction but at underdrive speeds (i.e., at speeds less than that of the input shaft 11 but in reverse direction).

From the foregoing it will be apparent that if the multi-ratio change speed mechanism or gear box 106 is shifted to any of the other speed ratios R the operating characteristics of the transmission 10 in the exemplary embodiment can be determined from FIGURE 10 associated with FIGURES 8 and 9 in the same manner as that described above for $R = \frac{1}{3}$.

Referring now to FIGURE 9 in swashplates position IV, the pump swashplate is at zero displacement (vertical position) and the motor swashplates are in either quadrant but not at zero displacement. Since the pump swashplate is at zero displacement, the pump 18 delivers no fluid and thus the input shaft 11 is freely rotatable. However, since the motors swashplates are not at zero displacement and as such can be driven by the countershafts 22 and 22', the motors 19 and 20 will function as fluid pumps. This may occur if the output shaft 12 is driven with the countershafts 22 and 22' engaged through the gear box 106 (e.g., $R = 1$). Where the transmission 10 is employed for propelling a vehicle and the vehicle is coasting the output shaft 12 is being driven by the vehicle and thus the motors 19 and 20 will pump fluid. Since the pump 18 is at zero displacement, it will not accept any fluid thus pumped by the motors 19 and 20. Therefore a pressure differential will exist between conduits 135 and 136 (FIGURE 7) which can be throttled there by brake valve 138. If the brake valve 138 is closed then under swashplates condition IV, the countershafts 22 and 22' would be hydraulically locked against rotation assuming that the power take-off control valve 124 is also closed. Therefore by controlling the rate of fluid flow through the brake valve 138 regulates the braking effect of countershafts 22 and 22' and correspondingly the output shaft 12 depending upon the selected ratio engaged in the gear box 106. Thus it has been shown that the transmission 10 may be effectively employed as a controllable brake on the output shaft 12 while the input shaft 11 idles freely.

Swashplates position V of FIGURE 9 is where the swashplates of both motors 19 and 20 and pump 18 are at zero displacement. In this condition irrespectively of whether the gear box 106 is in engaged or disengaged relation both input shaft 11 and output shaft 12 may rotate freely and thus the transmission 10 is in neutral condition with no power being transmitted therethrough. As a practical matter, it would be difficult to achieve condition V because of manufacturing tolerances and other reasons. Therefore to achieve a neutral condition, practically, the brake valve 138 of FIGURE 7 is merely opened wide which effectively bypasses the higher pressure to the lower pressure thus precluding the transmission of power through the transmission 10.

From the foregoing description of one embodiment of the invention it can be seen that the objects of the invention have been fully achieved and it must be understood that changes and modifications may be made which do not depart from the spirit of the invention nor from the scope thereof as defined in the appended claims.

What is claimed is:

1. An infinitely variable speed hydromechanical power transmission capable of transmitting rotary power in speed ratios including overdrive forward and overdrive reverse comprising, in combination:
   (a) an input shaft and an output shaft,
   (b) a multi-cylinder hydraulic pump driven by said input shaft,
   (c) said pump having a force reaction shaft driven thereby,
   (d) a shiftable change-speed gear mechanism having a countershaft engageable for drive relation with said output shaft,
   (e) said force reaction shaft connected in drive relation to said countershaft,
   (f) a multi-cylinder hydraulic motor hydraulically interconnected operably with said pump, said motor being drivingly connected to said countershaft,
   (g) said pump having an angularly displaceable swashplate hydraulically movable in two quadrants and servo-control therefor for controlling the fluid displacement of said pump, and
   (h) aid motor having an angularly displaceable swashplate hydraulically movable in two quadrants and servo-control therefor for controlling the fluid displacement of said motor
   whereby said gear mechanism is selectively operable to increase the proportion of power transmitted mechanically to said output shaft and correspondingly reduce the proportion of power transmitted hydraulically to said output shaft at a selected overall speed range thereby increasing the power efficiency transmitted through said transmission.

2. A hydromechanical power transmission according to claim 1 wherein said force reaction shaft is drivingly connected to said countershaft in fixed gear ratio.

3. A hydromechanical transmission according to claim 1 wherein said input and output shafts and said pump are in axial alignment with each other.

4. A hydromechanical transmission according to claim 1 wherein said motor is in axial alignment with said countershaft.

5. A hydromechanical transmission according to claim 1 wherein said shiftable change-speed gear mechanism is detachably connected to said pump and motor.

6. A hydromechanical transmission according to claim 1 wherein said motor is capable of hydraulically braking said output shaft controllably independent of said input shaft.

7. A hydromechanical transmission according to claim 1 wherein said pump is connected to fluid power take-off means.

8. A hydromechanical transmission according to claim 7 wherein said fluid power take-off means is independent of drive to said output shaft.

9. An infinitely variable speed hydromechanical power transmission having a rotatable input shaft and a rotatable output shaft in axial alignment comprising, in combination:
   (a) a multi-cylinder hydraulic pump operatively driven by said input shaft,
   (b) said pump having an angularly displaceable swashplate and hydraulic servo-control therefor for selectively controlling the hydraulic displacement thereof,
   (c) said swashplate being mounted on a rotatable reaction shaft and constrained for rotation therewith,
   (d) a shiftable multi-ratio change-speed gear mechanism having at least one countershaft engageable in drive relation with said output shaft,
   (e) a multi-cylinder hydraulic motor hydraulically interconnected operatively with said pump drivingly connected to each of said countershafts,
   (f) each of said motors having an angularly displaceable swashplate and hydraulic servo-control therefor for selectively controlling the displacement thereof,
   (g) means for selectively controlling the angular displacement of said swashplates of said motors in fixed relation with respect to each other,
   (h) said reaction shaft being connected to each of said countershafts in drive relation, and
   (i) fluid power take-off means connected to said pump and motors
   whereby said gear mechanism is selectively operable to increase the proportion of power transmitted mechanically to said output shaft and correspondingly reduce the proportion of power transmitted hydraulically to said output shaft at a selected overall speed range thereby increasing the power efficiency transmitted through said transmission.

10. A hydromechanical transmission with fluid power take-off capable of transmitting power at infinitely variable speeds from forward overdrive speeds to reverse overdrive speeds having a rotatable input shaft and a rotatable output shaft comprising, in combination:
   (a) a multi-cylinder hydraulic pump operatively driven by said input shaft,
   (b) said pump having an angularly displaceable swashplate and hydraulic servo-control therefor for selectively controlling the hydraulic displacement thereof,
   (c) said swashplate being mounted on a rotatable reaction shaft and constrained for rotation therewith,
   (d) a shiftable multi-ratio change-speed gear mechanism having a countershaft engageable for drive relation with said output shaft and said reaction shaft,
   (e) a multicylinder hydraulic motor hydraulically interconnected operatively with said pump drivingly connected to said countershaft,
   (f) said motor having an angularly displaceable swashplate and hydraulic servo-control therefor for controlling the displacement thereof, and
   whereby said gear mechanism is selectively operable to increase the proportion of power transmitted mechanically to said output shaft and correspondingly reduce the proportion of power transmitted hydraulically at a selected speed range thereby increasing the power efficiency transmitted through said transmission.

References Cited by the Examiner

UNITED STATES PATENTS 2,962,915   12/60   Wiggermann _____ 74—687

DON A. WAITE, *Primary Examiner.*